United States Patent [19]

Brown

[11] 4,122,378
[45] Oct. 24, 1978

[54] SOLID STATE SWITCHING CIRCUIT FOR AN ELECTROMAGNETIC PUMP

[75] Inventor: Ralph V. Brown, Cayuta, N.Y.

[73] Assignee: Facet Enterprises, Inc., Tulsa, Okla.

[21] Appl. No.: 751,417

[22] Filed: Dec. 16, 1976

[51] Int. Cl.² .............................................. H02K 33/02
[52] U.S. Cl. .................................. 318/128; 318/132; 318/134; 417/417
[58] Field of Search ........................ 310/34, 35, 30; 318/123, 128–134; 417/415–418

[56] References Cited

U.S. PATENT DOCUMENTS

| | | | |
|---|---|---|---|
| 3,229,225 | 1/1966 | Schimpf | 318/132 X |
| 3,278,818 | 10/1966 | Winestock | 318/130 X |
| 3,293,516 | 12/1966 | Maier et al. | 318/132 X |
| 3,381,616 | 5/1968 | Wertheimer et al. | 417/417 |
| 3,515,966 | 6/1970 | DeValroger et al. | 318/132 X |
| 3,629,674 | 12/1971 | Brown | 318/128 |
| 3,729,691 | 4/1973 | Beiswinger et al. | 318/128 |
| 3,804,558 | 4/1974 | Naito | 417/417 |
| 3,849,031 | 11/1974 | Charbonneau et al. | 417/417 |

Primary Examiner—Donovan F. Duggan
Attorney, Agent, or Firm—Remy J. VanOphem

[57] ABSTRACT

A solid state switching circuit for an electromagnetic pump is disclosed herein. The circuit comprises a Darlington amplifier controlling the current flow through the pump's solenoid in response to the state of a piston position sensitive electrical switch, a Zener diode and capacitance in the base circuit of the Darlington amplifier in parallel with the electrical switch and an inductive clamp circuit in parallel with the pump's solenoid coil.

12 Claims, 3 Drawing Figures

SOLID STATE SWITCHING CIRCUIT FOR AN ELECTROMAGNETIC PUMP

BACKGROUND OF THE INVENTION

1. Field of the Invention

The present invention relates to reciprocating piston electromagnetic fluid pumps, and in particular to a transistorized circuit for a reciprocating piston electromagnetic fluid pump.

2. Description of the Prior Art

Reciprocating piston electromagnetic fluid pumps as disclosed in the patent to Parker U.S. Pat. No. 2,994,792 (August, 1961) and Wertheimer et al., U.S. Pat. No. 3,381,616 (May, 1968) have obtained wide commercial acceptance, but in a highly competitive field, material and fabrication costs, and improvements in operation are very important. The early models of these pumps as represented by the one disclosed by Parker cited above included an electrical switch in circuit relationship with a solenoid coil which is either mechanically or magnetically actuated by the piston in the fully retracted or cocked position. Opening of the switch terminates the electrical power to the solenoid coil and the piston initiates its pumping stroke under the force of a cocked spring. Although this type of pump functions very satisfactorily and has a reasonable operational life, the switch is highly subject to failure and is determinative of the pump's operating life.

To increase the operational life of the pump, the use of the switch was abandoned and the art turned to blocking oscillators as taught by Wertheimer above. Blocking oscillators eliminated the switch problem but introduced the need for a sensing coil, increasing the complexity and cost of the pump. Unfortunately, blocking oscillators work fine only within limited temperature and voltage ranges, and outside the nominal ranges, starting problems were encountered. Temperature compensating networks using thermistos and voltage control networks using Zener diodes are presently being used to overcome these problems with limited success but have further increased the complexities and costs of the pumps as compared to the simple circuits disclosed by Wertheimer. The present invention combines the simplicity and reliability of the switch for assuring starting of the pump over a wide voltage and temperature range and the effectiveness of a solid state switch for trouble free switching of the current flow in the solenoid.

SUMMARY OF THE INVENTION

The invention is a circuit for controlling the current flow through the solenoid coil of a reciprocating piston electromagnetic pump. The circuit embodies a high gain Darlington type amplifier connected in series with the pump's solenoid coil. A Zener diode connected between the base and collector permits the Darlington amplifier to function as a Zener amplifier for voltages above the Zener voltage maintaining the potential between the Darlington's emitter and collector within specified limits and provides a low impedance path for RFI emissions. A capacitance is connected in parallel with the Zener diode providing for further suppression of RFI emissions when the Darlington amplifier is turned "OFF". A switch actuated in response to the position of the pump's piston is connected in series with a resistance between the base and collector of the Darlington amplifier and in parallel with the capacitance and Zener diode. A series connected resistance and diode are connected in parallel with the solenoid coil to dissipate a portion of the energy induced in the solenoid coil by the collapsing magnetic field when the Darlington amplifier is turned "OFF".

The switch is connected in the base circuit of the Darlington amplifier, and is isolated from the surge and inductive kick back energy solenoid coil in response to turning the Darlington amplifier ON and OFF by the series connected resistance. This isolation substantially increases the life of the switch and, therefore, the operating life of the pump.

The object of the invention is a circuit having a solid state switch controlling the solenoid current of a reciprocating piston electromagnetic pump in response to the opening and closing of an electrical switch sensitive to the position of the piston.

Another object of the invention is a circuit having a Zener diode in the base circuit of the solid state switch maintaining the emitter to collector potential within specified limits under overvoltage conditions.

Still another object of the invention is a control circuit having low REI emissions eliminating the need for an external RFI filter.

A further object of the invention is a circuit in which the size of the component elements are sufficiently small so that they may be included within the cavity of existing pumps.

These and other advantages will become evident from a reading of the specification with reference to the included drawings.

DETAILED DESCRIPTION OF THE PREFERRED EMBODIMENT

Figure 1:
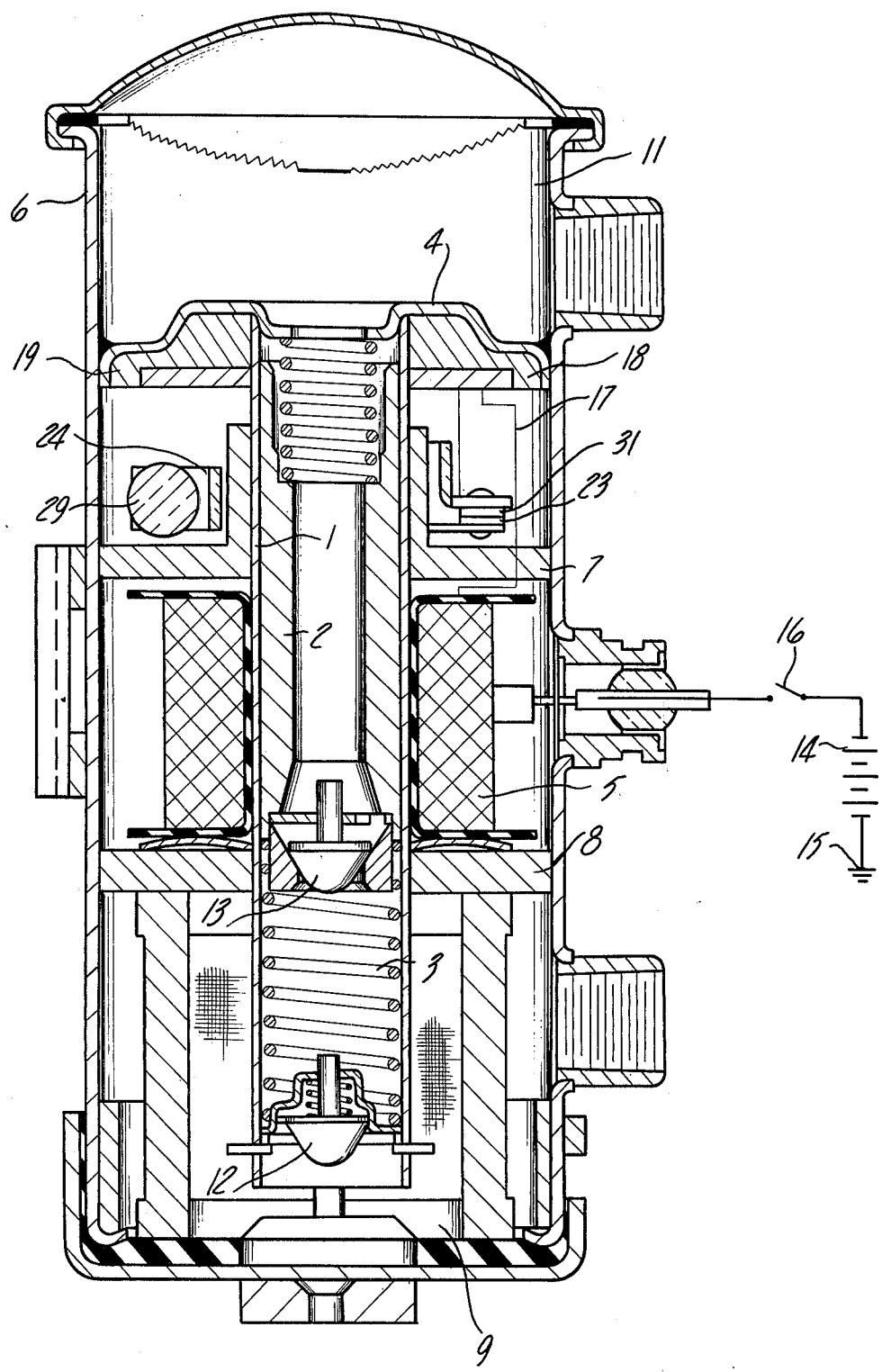
FIG. 1 is a verticle cross sectional view of a reciprocating piston electromagnetic pump showing the relevant elements of the pump and their inter-relationship.

In FIG. 1 of the drawing there is illustrated an electromagnetic pump comprising a non-magnetic cylinder 1 in which a hollow magnetic piston plunger 2 is mounted. A spring 3 is arranged to normally hold the piston plunger 2 against a yielding stop member 4 and a solenoid coil 5 surrounding the cylinder 1, is arranged to draw the piston 2 down against the force of the spring 3 when the solenoid coil is energized.

The cylinder 1 is mounted centrally in a casing 6 of magnetizable material by means of pole pieces 7, 8. The casing 6 forms an inlet chamber 9 and an outlet chamber 11. Check valves 12 and 13 connected to the cylinder 1 and piston 2 respectively, provide for fluid transfer from the inlet chamber to the outlet chamber as the piston is reciprocated.

Figure 3:
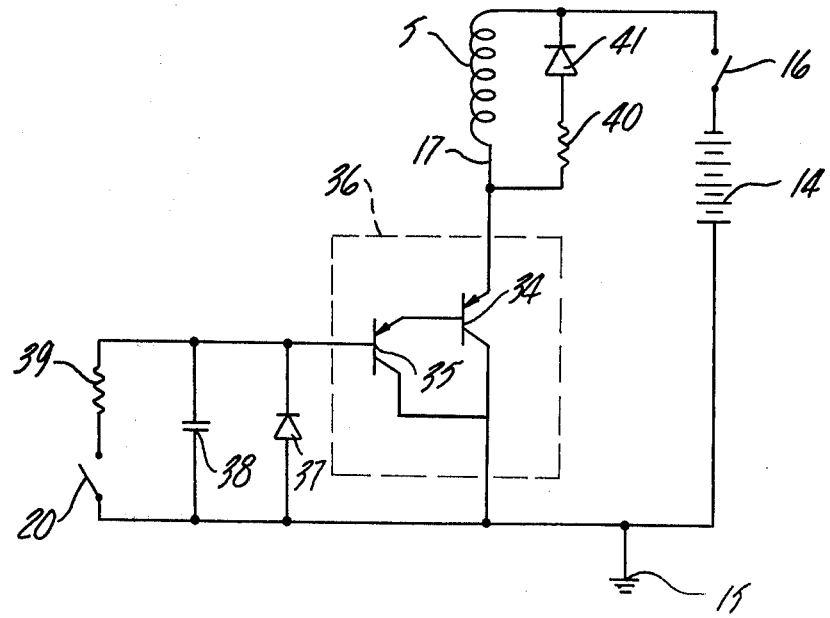
FIG. 3 is a circuit diagram of the preferred embodiment of the invention.

Means are provided for intermittently energizing the solenoid coil magnet 5 to cause reciprocation of the piston. As best shown in FIG. 3, this means comprises a source of electrical power illustrated as a battery 14 having its negative terminal connected to a common ground 15 and its positive terminal connected to the input end of a solenoid coil 5 through an ON-OFF switch 16. As is well known in the art, the source of electrical power may be an electrical generator or alternator powered by an external means such as an internal combustion engine.

The output end of the solenoid coil 5 is connected to the emitter of a pnp transistor 34 having its collector connected to the common ground and its base connected to the emitter of a second pnp transistor 35. The collector of transistor 35 is connected to the collector of transistor 34. This circuit arrangement of transistors 34 and 35 comprises the well known pnp Darlington amplifier 36. The emitter of transistor 34 is the emitter terminal of the Darlington amplifier, the connected collectors of transistors 34 and 35 comprises the collector of the Darlington amplifier and the base of transistor 35 is the base of the Darlington amplifier.

A Zener diode 37 having a predetermined cross over potential is connected between the base of transistor 35 and the collectors of transistors 34 and 35. A capacitance 38 is connected in parallel with Zener diode 37 between the base of transistor 35 and the collectors of transistors 34 and 35. A resistance 39 is connected between the base of transistor 35 and contact of a switch 20. The other contact of switch 20 is connected to the common ground 15 and the collectors of transistors 34 and 35. A series connected resistance 40 and diode 41 may be connected between the input and output of the solenoid coil and form an inductive clamp to absorb a portion of the energy induced in the solenoid coil by a collapsing magnetic field when the Darlington amplifier is turned OFF.

Referring back to FIG. 1, there is shown the battery 14, common ground 15 and switch 16 connected between the input end of the solenoid coil 5 and the positive terminal of battery 14. The output end of the solenoid coil is connected by lead 17 to circuit board 18 on which the components of the circuit shown in FIG. 3 are mounted. An epoxy or other moldable material 19 is used to hold the circuit board 18 in place and isolate the electrical components from the fluid being pumped.

Figure 2:
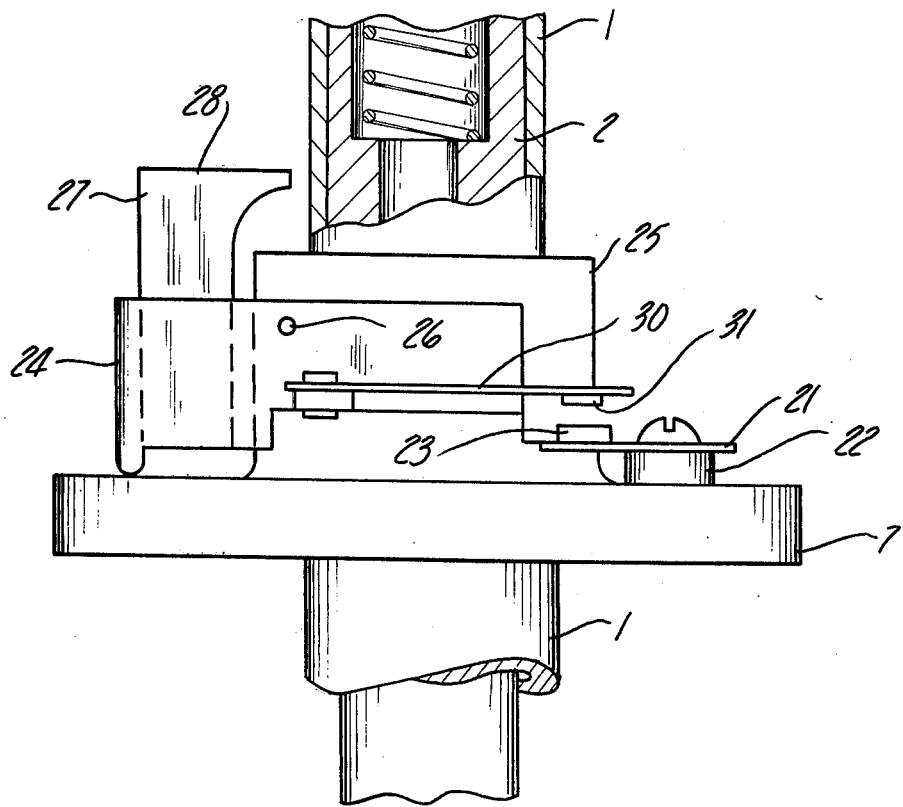
FIG. 2 is a cross section taken substantially on the line 2—2 of FIG. 1.

The details of switch 20 are preferentially shown in FIG. 2. A conductive blade 21 is supported from the pole piece 7 by an insulating support 22. The blade 21 carries an electrical contact 23 which is one of the electrical contacts of switch 20. A U-shaped bracket 24 is pivotally mounted from a boss 25 of pole piece 7 by means of pin 26. A shaped magnet 27 having a protruding portion 28 is supported from bracket 24 and moves therewith. A counter weight 29 (shown on FIG. 1) counterbalances the magnet 27, reducing the force necessary to rotate the bracket 24 clockwise about pin 26. A spring blade 30 is supported at one end from bracket 24 and carries contact 31 at its opposite end directly opposite contact 23.

At the end of the pump stroke, with the piston 2 in the uppermost position, as shown in FIG. 1, the magnet 27 is attracted towards the piston disposed in cylinder 1, rotating the bracket 24 and spring blade 30 in a clockwise direction, causing contact 31 into contact with contact 23, closing the switch. When the piston is in the retracted position against the force of spring 3, the piston 2 is displaced downward away from the protruding portion 25 and the magnet 27 is no longer attracted towards cylinder 1. Gravitational forces aided by the magnetic forces attracting the base of magnet 27 then rotate the bracket 24 in a counterclockwise direction and contact 31 on the end of spring blade 30 is separated from contact 23.

The operation of the circuit in combination with the illustrated pump is as follows. Starting with the pump elements in the position shown, the piston 2 is at the end of its stroke causing contacts 23 and 31 of switch 20 to close providing a current path from the base of transistor 35 to the common ground 15 through resistance 39 and the closed contacts of switch 20. Resistance 39 is selected so that when switch 20 is closed, transistor 35 is sufficiently conductive to turn transistor 34 fully ON. Current flows through the solenoid coil 5 generating a magnetic field of sufficient strength to retract the piston 2 to its start position against the bias force of spring 3. In the retracted position, the top end of the piston 2 is substantially below the protruding portion 28 of magnet 27 and the attractive force between the piston 2 and protruding portion 28 is terminated, and bracket 24 rotates in a counterclockwise direction separating contacts 23 and 31. The separation of contacts 23 and 31 effectively terminates the current flow in this branch of the Darlington amplifier's base circuit tending to turn the Darlington amplifier 36 OFF. However, the abrupt turn off occasioned by the opening of the contacts of switch 20 is temperated tempered by the action of capacitance 38 which continues to be charged by the base current from transistor 35 as the potential at the emitter of transistor 34 starts to rise in response to the termination of the base current flowing through the branch of the base circuit containing switch 20. This prevents an abrupt termination of the current flow through solenoid coil 5 and initiates a controlled collapse of the magnetic field which helps to suppress RFI emissions from the circuit.

When capacitance 38 becomes charged to a value approximately equal to the potential of source 14, the Darlington amplifier turns OFF and the remaining magnetic field rapidly collapses inducing its stored energy back into the solenoid coil. The induced energy tends to raise the potential at the emitter of the Darlington amplifier well above the potential of source 14; however, as the potential at the emitter rises, this potential transmitted to the cathode of Zener diode 37 through the emitter to base connections of transistors 34 and 35. When this potential exceeds the cross over potential of the Zener diode, it conducts turning the Darlington amplifier back on, permitting it to dissipate a portion of the induced energy. In this mode of operation, the Zener diode and Darlington amplifier act as a Zener amplifier, maintaining the emitter to collector voltage applied across the Darlington amplifier within specified limits. In some applications, the Darlington amplifier by itself would be incapable of dissipating to total induced energy without significantly increasing its physical size and power dissipation capabilities. This is alleviated by the inductive clamp comprising resistance 40 and diode 41 which also will dissipate a portion of the induced energy thereby dividing the induced energy between two separate branches of the circuit. By appropriate selection of the cross over potential of the Zener diode 37 and the value of resistance 40, the energy dissipated by the Darlington amplifier and the inductive clamp is apportioned so that their combined physical size are minimized, reducing the size and cost of the individual circuit components. Without this dissipation apportionment between the Darlington amplifier and the inductive clamp, the increase in size, cost and availability of components would make it impractical to embody the circuit within the cavity of the pump without a significant increase in the pump's physica size.

The Zener amplifier mode of operatio of the circuit in the dissipation of the induced energy also causes the inductance of the solenoid coil to act as an RFI emissions suppressor. Further, suppression of RFI emissions is also accomplished in this mode of operation by the inductance of the solenoid coil in series with capacitance 38 through the emitter to base connections of transistors 34 and 35 which form an LC filter.

With the termination of electrical power to the solenoid in its retracted position in response to the opening of the contacts of switch 20, the piston is urged forward in a pumping stroke by the resilient force of spring 3. As the piston moves forward, the magnet 27 is once again attracted towards cylinder 1 and bracket 24 is rotated clockwise again, closing contacts 23 and 31. Closing of contacts 23 and 31 turns the Darlington amplifier back "ON" energizing solenoid coil 5 whereupon the operation is repeated.

Tests conducted with the circuit disclosed show that the operational life of the switch 20 is significantly increased and the operational life of the pump approaches that of pumps embodying blocking oscillators. The tests also have proven that RFI emissio specifications have been met without the need for external RFI suppressors.

Although the invention has been described and illustrated with reference to a particular pump structure and arrangement for switch 20, it will be understood that changes may be made in the precise details shown without departing from the spirit of the invention. Different types of switches, switch arrangements, and mechanisms for activation are well known in the art and may be substituted for that shown without deviating from the invention. It is further well known to those skilled in the art that functionally equivalent components may be substituted in the disclosed circuit without departing from the teachings herein.

What is claimed is:

1. A reciprocating piston electromagnetic pump comprising:
   a pump housing having a fluid inlet chamber and an outlet chamber;
   a non-magnetic cylinder centrally disposed in said pump housing, connecting said inlet chamber with said outlet chamber;
   a solenoid coil surrounding a portion of said non-magnetic cylinder for generating a magnetic field in response to a current flow therethrough;
   a magnetically susceptable reciprocating piston member disposed in said non-magnetic cylinder movable in response to the magnetic field generated by said solenoid coil;
   valve means for providing a unidirectional fluid flow through said pump housing from said inlet chamber to said outlet chamber in response to the reciprocating movement of said piston member;
   switch means for generating a signal when said pistion member is at the end of its reciprocating motion towards said inlet chamber;
   solid state switch means in series circuit relationship with said solenoid coil for controlling the current flow therethrough in response to said signal, said solid state switch means having an emitter connected to one end of said solenoid coil, a base connected to said switch means through a resistance and a collector; and
   a Zener diode connected between said base and said collector, said Zener diode causing said solid state switch to function as a Zener amplifier when the potential between said emitter and said collector exceeds a predetermined value; and p1 a capacitance connected between said bsse and said collector in parallel with said Zener diode.

2. The pump of claim 1 wherein said solenoid coil receives induced energy from the collapsing of said magnetic field when said solid state switch means is turned off, increasing the potential between said emitter and said collector, said Zener diode has a predetermined cross-over potential above which said solid state switch functions as a Zener amplifier and apportions the dissipation of said induced energy between said series connected resistance and diode and said solid state switch means.

3. The pump of claim 2 wherein said Zener diode has a predetermined cross-over potential selected to minimize the combined physical size of said series connected resistance and said solid state switch means.

4. The pump of claim 3 wherein said solid state means is a Darlington amplifier.

5. The pump of claim 4 further including a series connected resistance and diode connected between the one end of said solenoid coil and the other end of said solenoid coil, forming an inductive clamp.

6. In combination with a reciprocating piston electromagnetic pump having an inlet chamber and an outlet chamber, a non-magnetic cylinder centrally disposed connecting the inlet chamber to the outlet chamber, a solenoid coil surrounding at least a portion of the non-magnetic cylinder generating a magnetic field in response to a current flow therethrough, a magnetically susceptable reciprocating piston member disposed in said non-magnetic cylinder, movable in response to the magnetic field generated by the solenoid coil, valve means for providing a unidirectional fluid flow through the pump in response to the reciprocating movement of the piston member, and an electrical switch having a closed state and an open state when the piston is at the end of its reciprocating motion in response to the magnetic field generated by the solenoid coil, a circuit for controlling a current flow through said solenoid coil in response to the state of the electrical switch comprising:
   solid state switch means in series circuit relationship with the solenoid coil for controlling the current flow therethrough in response to the state of the electrical switch, said solid state switch means having an emitter connected to one end of the solenoid coil, a base connected to one end of the electrical switch through a resistance, and a collector; and
   a Zener diode having a predetermined cross-over potential connected between said base and said collector to cause said solid state switch means to function as a Zener amplifier when the potential between said emitter and said collector exceeds said cross-over potential.

7. The combination of claim 6 further including a series connected resistance and diode connected between the one end of the solenoid coil and the other end of the solenoid coil to dissipate a portion of the energy induced in the solenoid coil by a collapsing magnetic field.

8. The combination of claim 7 wherein said circuit further includes a capacitance connected between said base and said collector in parallel with said Zener diode.

9. The combination of claim 8 wherein said solenoid coil receives induced energy from the collapsing magnetic field when said solid state switch means is turned off increasing the potential between said emitter and said collector, said Zener diode has a predetermined cross-over potential selected to cause said induced energy to be partially dissipated by said series connected resistance and diode and partially dissipated by said solid state switch means functioning as a Zener amplifier.

10. The combination of claim 9 wherein said Zener diode has a predetermined cross-over potential selected to minimize the combined physical size of said series connected resistance and said solid state switch.

11. The combination of claim 10 wherein said solid state switch means is a Darlington amplifier.

12. In combination with a reciprocating piston electromagnetic fluid pump having a solenoid coil generating a magnetic field in response to a current flowing therethrough, a reciprocating piston member movable in response to the magnetic field generated by the solenoid coil, valve means providing a unidirectionl fluid flow through the pump, and a piston position sensitive electrical switch assuming an open state in response to a first position of the piston and assuming a second state when said piston is displaced from said first position, a circuit for controlling the current flow through said solenoid coil in response state of the electrical switch comprising:

a Darlington amplifier having an emitter connected to said solenoid coil, a collector, and a base connected to said collector through the electrical switch;

a Zener diode connected between said base and said collector in parellel with the electrical switch; and a capacitance connected between said base and said collector in parallel with said Zener diode.

* * * * *

UNITED STATES PATENT AND TRADEMARK OFFICE
CERTIFICATE OF CORRECTION

PATENT NO. : 4,122,378
DATED : October 24, 1978
INVENTOR(S) : Ralph V. Brown

It is certified that error appears in the above-identified patent and that said Letters Patent are hereby corrected as shown below:

Column 2, line 24, delete the word "REI" and insert therefor the word ----RFI----.

Column 4, line 21, delete the word "temperated".

Column 4, line 66, delete the word "physica" and insert therefor the word ----physical----.

Column 4, line 67, delete the word "operatio" and insert therefor the word ----operation----.

Column 5, line 21, delete the word "emissio" and insert therefor the word ----emission----.

Column 6, line 1, delete "pl".

Column 6, line 2, delete the word "bsse" and insert therefor the word ----base----.

Signed and Sealed this

Twenty-fourth Day of April 1979

[SEAL]

Attest:

RUTH C. MASON
Attesting Officer

DONALD W. BANNER
Commissioner of Patents and Trademarks